United States Patent [19]

Walser

[11] Patent Number: 4,607,709
[45] Date of Patent: Aug. 26, 1986

[54] MOTOR DRIVEN HAND-HELD MACHINE WITH TWO PART TOOL ASSEMBLY

[75] Inventor: Hans-Heinrich Walser, Gruesch, Switzerland

[73] Assignee: Trumpf GmbH & Co., Ditzingen, Fed. Rep. of Germany

[21] Appl. No.: 645,604

[22] Filed: Aug. 29, 1984

[30] Foreign Application Priority Data

Sep. 7, 1983 [DE] Fed. Rep. of Germany ....... 3332258

[51] Int. Cl.4 .............................................. B23B 45/00
[52] U.S. Cl. ...................................... 173/170; 83/916; 30/241
[58] Field of Search ........................ 30/241, 242, 243; 83/916; 173/168, 169, 170, 12; 192/33 C

[56] References Cited

U.S. PATENT DOCUMENTS

| 2,967,355 | 1/1961 | Yermish | 30/241 X |
| 3,025,600 | 3/1962 | Leibinger | 30/241 X |
| 3,942,250 | 3/1976 | Kurosaki | 83/916 X |
| 3,988,827 | 11/1976 | Sakamoto et al. | 30/241 X |
| 4,158,913 | 6/1979 | Batson | 30/241 |

FOREIGN PATENT DOCUMENTS 505374 8/1954 Canada ................................. 83/916

Primary Examiner—E. R. Kazenske
Assistant Examiner—Willmon Fridie, Jr.

[57] ABSTRACT

A motor driven portable machine tool has a drive motor and a first gear mechanism which is driven thereby. Spaced from the first gear mechanism is a second gear mechanism, and it is drivingly engageable therewith through a disengageable coupling including a pair of coupling elements, a coiled spring disposed thereabout, and a clutch member rotatably disposed about the coil spring and adapted to tightly coil it about the coupling elements to effect driving engagement therebetween. A latch member is engageable with the clutch member to prevent its rotation, and a stop mechanism is operatively connected to the latch member to engage the latch member with the clutch member after one complete stroke of the tool which is being driven thereby. The stop mechanism may include a cam follower, and a cam surface on one of the gears, so that, upon a single revolution of that gear, the stop mechanism will effect the relatching of the clutch member to terminate the transmission of the power through the clutch.

8 Claims, 2 Drawing Figures

MOTOR DRIVEN HAND-HELD MACHINE WITH TWO PART TOOL ASSEMBLY

BACKGROUND OF THE INVENTION

The present invention relates to portable machine tools, and more particularly to such machine tools in which a first tool element is reciprocated relative to a second tool element to perform machine operations in a single stroke or cycle.

Portable machine tools employing electric or hydraulic motors to perform various machining operations upon a workpiece have gained substantial acceptance and are now widely employed. Some of these machines are designed to effect a continuous series of repetitive strokes or cycles of the tool elements relative to each other over a substantial length of the workpiece, as, for example, shears to effect the cutting of the metal, or a punch and die mechanism to perform a nibbling operation. Thus, the tool elements will be relatively reciprocated continuously along the surface of the workpiece for so long as the operator has the operating elements in driving engagement by operation of a manual switch.

However, in some machine tool operations, only a single stroke is desired, such as, for example, in the punching of spaced holes in a workpiece. In such a case, it is desired that the machine tool produce a down stroke to perform the desired work upon the workpiece, and then return in an up stroke to its initial position where it will be stable until the next actuation of the mechanism by the operator. Attempting to produce a single stroke with a machine tool in which the drive motor is normally drivingly engaged with the tool driving mechanism to produce repeat cycles is impractical because of the high speed of the drive motor and the difficulty of stopping the tool elements after a single cycle, particularly in a predetermined position.

Although single cycle machine tools are available, they tend to produce extremely high torque at various points within the drive mechanisms, and the repeated starting and stopping operations will therefore produce substantial wear and tear upon the parts. Moreover, some such tools do not include means for ensuring that the mechanism will be stopped in the most disengaged position of the reciprocating tool element.

It is an object of the present invention to provide a novel portable machine tool having a tool element reciprocatable relative to a fixed tool element in a single complete stroke or cycle, which is highly effective and durable, and which stops the tool element in an initial predetermined position after each complete stroke.

It is also an object to provide such a machine tool in which the elements may be fabricated readily and relatively economically.

A specific object is to provide such a machine tool in which there is provided between first and second gearing levels, a transmission which will be subject to relatively lesser wear and which is coupled to a stop mechanism so as to ensure that the movable machine tool element will be stopped in its upper or remote position.

SUMMARY OF THE INVENTION

It has now been found that the foregoing and related objects and advantages may be readily attained in a motor-driven portable machine tool which includes a housing, a drive motor with a rotatable output shaft, and a tool driving member mounted for reciprocation in the housing at a point spaced from the output shaft. The tool driving member has means for mounting a tool for reciprocation thereby, and a tool drive assembly is operatively connected thereto for effecting its reciprocation. In the housing is a first gear mechanism with a gear driven by the output shaft, and a second gear mechanism which is drivingly engaged with the tool drive assembly. Coupling means is provided between the first and second gear mechanism to effect transfer of rotation from the output shaft to rotation of the second gear mechanism and thereby the tool drive assembly. This coupling means includes axially adjacent first and second half couplings supported for rotation in the housing about a common axis, and the half couplings are rotatable relative to each other. A coil spring is disposed about axially adjacent circumferential surfaces on the half couplings, and the first gear mechanism includes a second gear operatively connected to the adjacent first half coupling to effect its rotation. The second gear mechanism includes a driven gear operatively connected to the adjacent second half coupling and is rotated thereby and to transmit the rotation to the tool drive assembly. A spring is engaged at one end with the second half coupling, and a clutch member having the other end of the spring engaged therewith is rotatable about the axial surface of first half coupling.

A releasable latch member is engaged with the clutch member to prevent its rotation, and release thereof from such engagement causes the spring to coil tightly about the adjacent surfaces of both half couplings and thereby effects driving engagement therebetween. Upon reengagement of the latch member with the clutch member, this produces an enlargement of the diameter of the coil spring about the adjacent circumferential surfaces to disengage the half couplings. A stop mechanism is operatively connected to the latch member to move the latch mechanism into engagement with the clutch member to stop the tool driving member in one extreme position of reciprocation.

Preferably, the clutch member has a generally circular configuration with a projecting lobe or cam at one point about its circumference which is engageable with the latch member. The releasable latch member is an arm on a lever member pivotably mounting in the housing, and the machine tool includes operating means to effect pivotal movement of the lever member to disengage the latch member. The lever member has a second arm operatively engaged with a cam mechanism to permit but a single revolution of the clutch member and thereby comprise a part of the stop mechanism. This cam mechanism comprises a continuous surface including a cam portion to cam the second arm and thereby the first mentioned arm to latching engagement with the clutch member. Desirably, the continuous surface comprises a cam recess, and the second arm has a follower thereon movable in the recess.

In the preferred embodiment, the machine tool includes a manually actuatable switch on the housing and a control rod movable thereby. The stop mechanism includes a lever member pivotable by movement of the control rod to effect disengagement of the latch member.

DETAILED DESCRIPTION OF THE ILLUSTRATED EMBODIMENT

Figure 1:
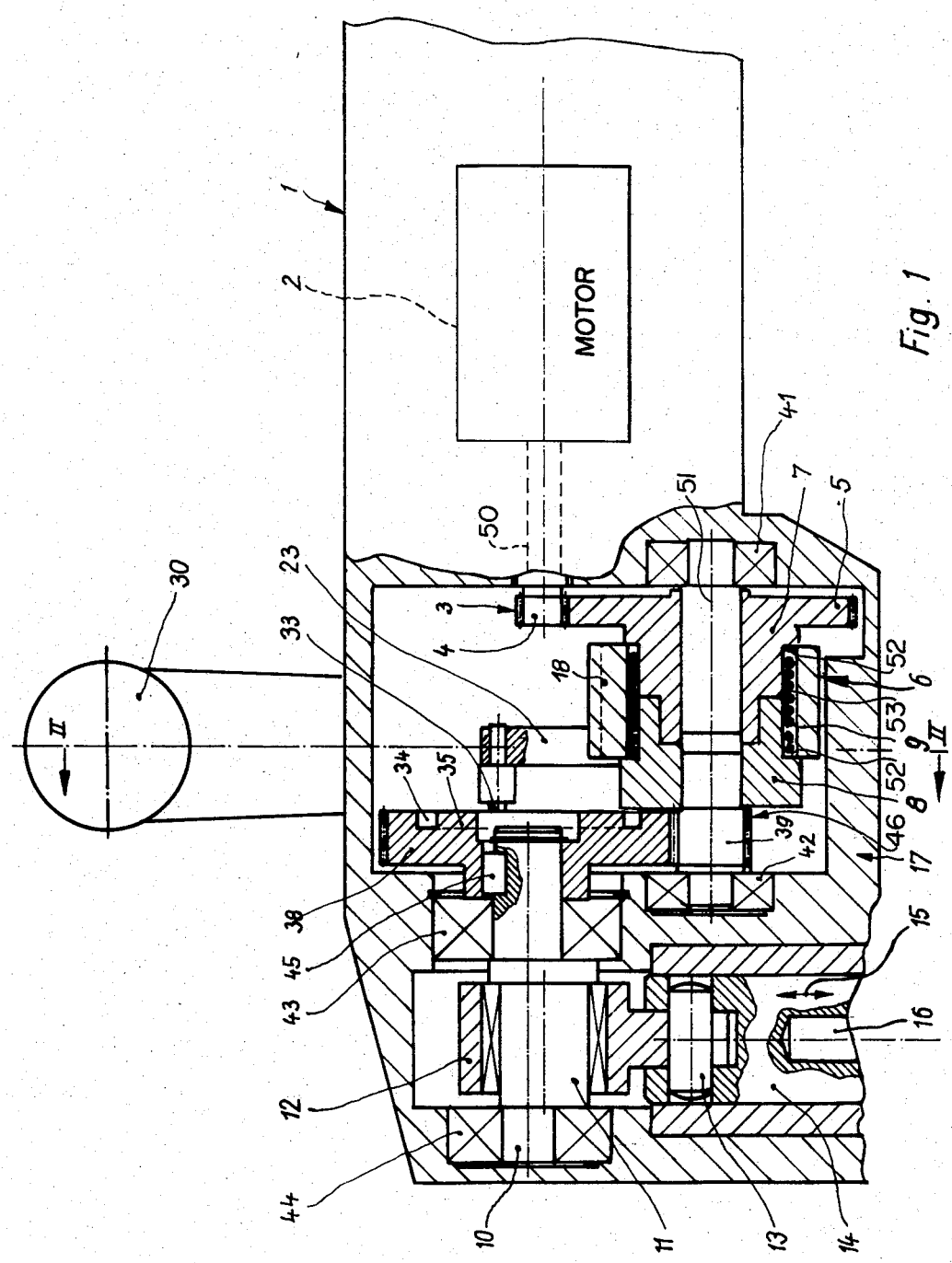
FIG. 1 is a fragmentary side elevational view in partial section of a portable machine tool embodying the present invention.
Figure 2:
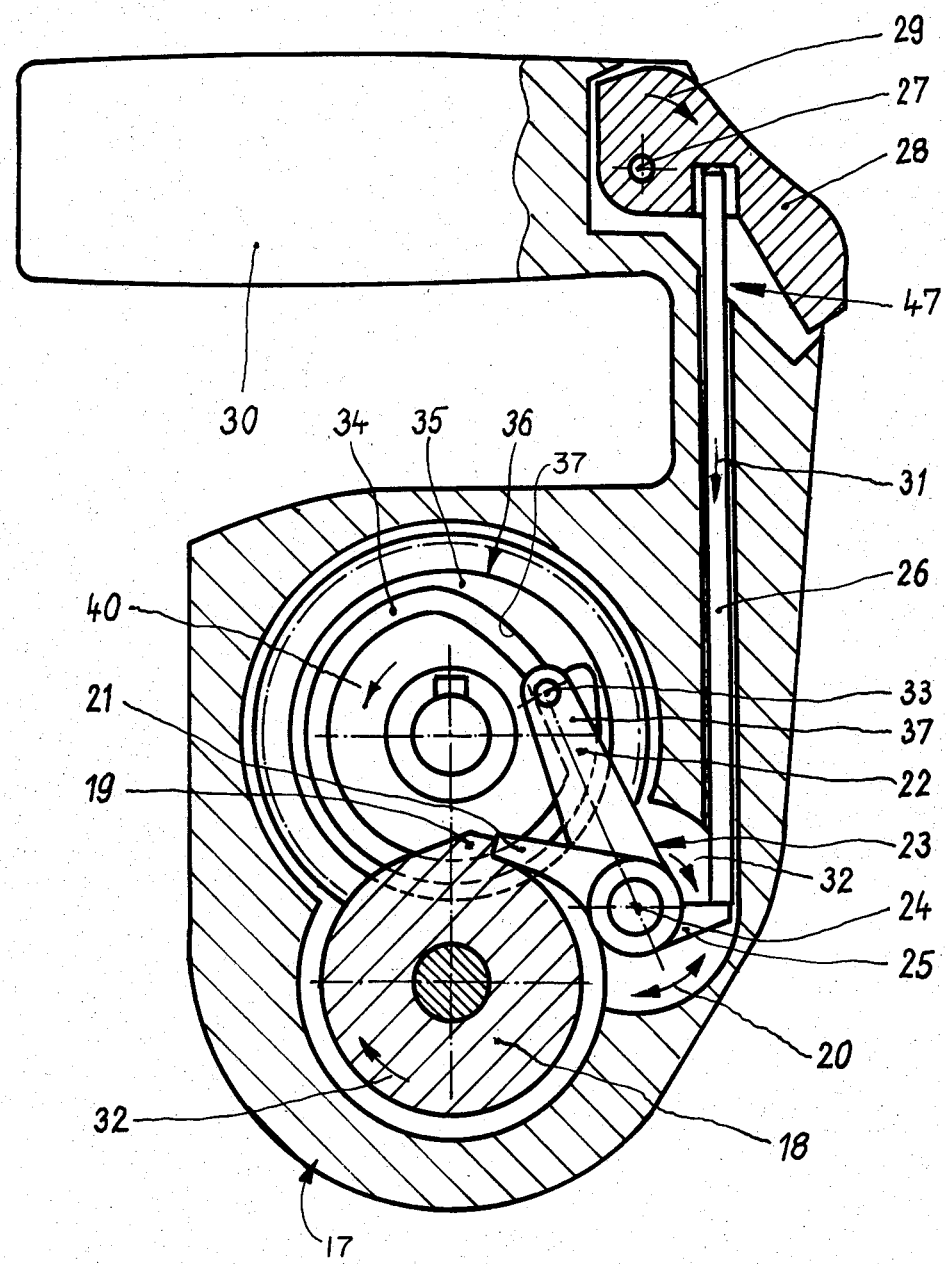
FIG. 2 is a sectional view thereof along the line 2—2 of FIG. 1.

Turning in detail to FIGS. 1 and 2, a portable machine tool embodying the present invention has a housing providing a head generally designated by the numeral 17 with a main handle generally designated by the numeral 1 extending to one side thereof, and a grip handle 30 extending over the top of the head 17. Disposed within the handle 1 is an electric motor designated by the numeral 2 which is only schematically illustrated. Its output shaft 50 extends forwardly towards the head 17, and it is turned on and off by a switch (not shown) in the power supply lines (not shown).

The rotary motion of the output shaft 50 is imparted to a first gear mechanism generally designated by the numeral 3 and including the pinion gear 4 which is mounted on the end of the output shaft 50, and the ring gear 5 which is engaged therewith. The ring gear 5 in turn is formed integrally with, or coupled to, the drive side of the coupling generally designated by the numeral 6, and more particularly the half coupling 7 which is rotatable upon the shaft 51. The shaft 51 in turn has its ends journalled in the bearings 41 and 42 seated in the head 17 of the housing.

The output side of the coupling 6 is provided by the second half coupling 8 which is fixed upon the shaft 51. Accordingly, when the half coupling 8 is rotated by operative engagement with the half coupling 7, it will effect rotation of the shaft 51 within the bearings 41 and 42. The two half couplings 7 and 8 have aligned circumferential surfaces terminating at their opposite ends in steps 52 or shoulders defining a recess 53 in which is disposed a coil spring 9. One end of a spring 9 is firmly attached to the half coupling 8.

Radially outwardly of the spring 9 and in radial alignment over the recess 53 is a clutch member 18. Its configuration is best seen in FIG. 2 and is generally circular with a cam or cog projection 19; the opposite end of the spring 9 is engaged with the clutch member 18. When the cam member 18 is free to rotate about the half couplings 7 and 8, the rotation will cause the spring 9 to wind tightly about the adjacent surfaces of the half couplings 7 and 8 and thereby produce driving engagement therebetween. This in turn will effect rotation of the shaft 51.

At the end of the shaft 51 spaced from the first gear mechanism 3 is the second gear mechanism generally designated by the numeral 46 and includindg the pinion gear 39 which is fixed upon the shaft 51. Drivingly engaged with the pinion gear 39 is the large gear 38 which is secured to the shaft 10 by the lock spring 45 so as to effect rotation of the shaft 10 which is journalled in the bearings 43 and 44. The shaft 10 will freely rotate within the head 17, and it has an eccentric or cam portion 11 which is received within a bore of the connecting rod 12 so as to rotate therewithin and effect reciprocal motion of the connectng rod 12.

The connecting rod 12 in turn is coupled to the upper end of the ram 14 by the pin 13, and it is provided with a recess at its opposite end to seat the mounting portion of a tool designated by the numeral 16. Thus, the ram 14 and thereby the tool 16 will be reciprocated in the direction of the arrow 15.

As best seen in FIG. 2, a lever member generally designated by the numeral 23 is pivotally mounted within the head 17 for reciprocal motion and about the axis of rotation 24 as indicated by the arrow 20. It includes a first lever arm 21 which is engageable with the cam surface 19 on the clutch member 18 so as to preclude its rotation. Upon depression of the manual operating lever 28 by the operator, it will pivot about its axis of rotation 27 in the direction indicated by the arrow 29 to move the control rod 26 downwardly as shown by the arrow 31. This will cause the rod 26 to bear against the third lever arm 25 and effects pivoting of the lever member 23 in a clockwise direction as indicated by the arrow 32, thereby moving the lever arm 21 in the clockwise direction to release it from engagement with the cam surface 19 so that the clutch member 18 is free to rotate in the direction shown by the arrow 32. As previously indicated, when the clutch member 18 is free to rotate, the spring 9 is wound about the two half couplings 7 and 8 to produce the driving engagement therebetween. Thus, the drive of the motor 2 is transmitted through the first gear mechanism 3, through the coupling 6, to the second gear mechanism 46, and thence to the drive mechanism 10 for the ram 14. In turn, the ram 14 effects the reciprocation of the machine tool element 16 relative to a fixed machine tool element (not shown).

The lever assembly 23 also includes a lever arm 22 which has a cam follower 33 at its free end that extends into a cam track 34 provided within the cam disk 35 that is secured or formed on to the face of the gear 38.

As seen in FIG. 2, the cam track 34 has a radially enlarged portion adjacent the at rest position of the cam follower 33 so that the cam follower pin 33 may move radially outwardly upon manual actuation of the operating assembly 47.

Upon rotation of the gear 38 in the direction of the arrow 40 as a result of the transmission of driving force through the coupling 6, the cam follower 33 moves in the cam track 34 until it reaches the inwardly extending or narrowing portion 37. As it is moved inwardly in the track portion 37 by the continuing rotation, it pivots the lever member 23 in a counterclockwise direction and the lever arm 21 engages the cam surface 19 to prevent rotation of the clutch member 18. This now causes the spring 9 to override and open so that it is expanded into frictional engagement with the inner surface of the clutch member 18. Because transmission through the coupling is terminated, the gear 38 stops its rotation, and the ram 14 stops in its elevated position after one full stroke. This stop mechanism is generally designated by the numeral 36.

As will be readily appreciated, the gear ratios in the first and second gear mechanisms 3 and 46 are designed to convert the high speed of revolution of the motor 2 to a relatively low speed of rotation of the shaft 10. Moreover, the several gears and the cam track 34 are cooperatively dimensioned so that, subsequent to release of the clutch member 18 to effect engagement of the half couplings 7 and 8 to effect transmission of the drive force, only a single rotation of the gear 38 will occur before the lever member 23 is pivoted by the cam track 34 to reengage the lever arm 21 with the clutch member 18 and stop the driving force. Thus, the ram 14 will have been driven downwardly and returned to its uppermost position during the single cycle or full stroke produced thereby. Moreover, if the operator still has his finger depressing the lever 28 of the manual operating assembly, the engagement of the lever arm 21 with the clutch member 18 will cam the lever 28 upwardly against his finger pressure due to the force of rotation.

To produce the next stroke, the operator must again depress the lever 28 to repeat the cycle which has heretofore been described. Thus, a series of single strokes may be utilized to perform a spaced series of operations along the workpiece with the tool elements being spaced apart to enable free movement of the workpiece therebetween.

It should be appreciated that the spring 9 in the initial position is subject to very high spring tension as the result of the override from the preceeding stroke. This spring tension will, upon release of the clutch member 18, produce almost instantaneous coiling of the spring 9 tightly around the half couplings 7 and 8 to effect the operative engagement of the coupling 6.

As can be seen from the foregoing detailed specification and attached drawings, the portable machine tool of the present invention may be fabricated readily from rugged elements which may be readily and relatively economically fabricated. They are assembled in a fashion so as to provide an effective transmission which will enjoy reasonably long life. Moreover, the machine tool includes a stop mechanism operatively connected to the transmission mechanism to stop the drive mechanism after a single stroke, thus enabling the fascile movement of a workpiece between the movable tool member and a fixed tool member cooperating therewith.

Having thus described the invention, what is claimed is:

1. In a motor-driven portable machine tool, the combination comprising:
    (a) a housing;
    (b) a drive motor in said housing including a rotatable output shaft;
    (c) a tool driving member mounted for reciprocation in said housing at a point spaced from said output shaft and having means for mounting a tool for reciprocation thereby;
    (d) a tool drive assembly operatively connected to said tool driving member to effect its reciprocation;
    (d) a first gear mechanism including a gear driven by said output shaft;
    (f) a second gear mechanism drivingly engaged with said tool drive assembly;
    (g) coupling means between said first and second gear mechanisms to effect transfer of rotation from said output shaft to rotate of said second gear mechanism and thereby said tool drive assembly, said coupling means including:
        (i) axially adjacent first and second coupling halves supported for rotation in said housing about a common axis, said coupling halves being relatively rotatable;
        (ii) a coil spring disposed about axially adjacent circumferential surfaces on said coupling halves, said first gear mechanism including a second gear operatively connected to the adjacent first coupling half to effect its rotation, said second gear mechanism including a driven gear operatively connected to the adjacent second coupling half to be rotated thereby and transmit the rotation to said tool drive assembly, said spring being engaged at one end with said second coupling half;
        (iii) a clutch member having the other end of said spring engaged therewith and rotatable about said axial surface of first coupling half; and
        (iv) a releasable latch member engageable with said clutch member to prevent its rotation, release thereof from such engagement causing said spring to coil tightly about said adjacent surfaces of both coupling halves and thereby effecting driving engagement therebetween, said latch member upon reengagement with said clutch member producing an enlargement of the diameter of said coil spring about said surfaces to disengage said coupling halves; and
    (h) a stop mechanism operatively connected to said latch member for moving said latch member into engagement with said clutch member to stop said tool driving member in one extreme position of reciprocation.

2. The portable machine tool in accordance with claim 1 wherein said clutch member has a generally circular configuration with a projecting lobe at one point about its circumference engageable with said latch member.

3. The portable machine tool in accordance with claim 2 wherein said releasable latch member is an arm on a lever member pivotably mounted in said housing, and wherein said machine tool includes operating means to effect pivotal movement of said lever member to disengage said latch member.

4. The portable machine tool in accordance with claim 3 wherein said lever member has a second arm operatively engaged with a cam mechanism to permit but a single revolution of said clutch member and thereby comprising a part of said stop mechanism.

5. The portable machine tool in accordance with claim 4 wherein said cam mechanism comprises a continuous cam surface including a cam portion to cam said second arm and thereby said first mentioned arm to latching engagement with said clutch member.

6. The portable machine tool in accordance with claim 5 wheren said continuous surface comprises a cam recess and wherein said second arm has a follower thereon movable in said recess.

7. The portable machine tool in accordance with claim 1 stop mechanism includes cam means for limiting rotation of said tool driving gear assembly to a single revolution.

8. The portable machine tool in accordance with claim 1 wherein said machine tool includes a manually actuatable switch on the housing, a control rod movable thereby, and wherein said stop mechanism includes a lever member pivotable by movement of said control rod to effect disengagement of said latch member.

* * * * *